(12) United States Patent
Gerardon et al.

(10) Patent No.: US 11,113,549 B2
(45) Date of Patent: Sep. 7, 2021

(54) METHOD AND DEVICE FOR ANALYZING AN IMAGE AND PROVIDING THE ANALYSIS FOR A DRIVING ASSISTANCE SYSTEM OF A VEHICLE

(71) Applicant: Robert Bosch GmbH, Stuttgart (DE)

(72) Inventors: Caroline Gerardon, Neustetten (DE); Omar Alaa El-Din, Hannover (DE); Tobias Stumber, Rutesheim (DE); Steffen Brueggert, Hildesheim (DE); Alvaro Marcos-Ramiro, Munich (DE); Matthias Kirschner, Hildesheim (DE); Matthias Wacker, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 16/470,795

(22) PCT Filed: Nov. 22, 2017

(86) PCT No.: PCT/EP2017/080033
§ 371 (c)(1),
(2) Date: Jun. 18, 2019

(87) PCT Pub. No.: WO2018/114181
PCT Pub. Date: Jun. 28, 2018

(65) Prior Publication Data
US 2020/0089975 A1    Mar. 19, 2020

(30) Foreign Application Priority Data
Dec. 21, 2016   (DE) .......................... 102016225876.1

(51) Int. Cl.
*G06K 9/00*     (2006.01)
*B60W 40/02*    (2006.01)
*G06K 9/62*     (2006.01)

(52) U.S. Cl.
CPC ......... *G06K 9/00825* (2013.01); *B60W 40/02* (2013.01); *G06K 9/00362* (2013.01);
(Continued)

(58) Field of Classification Search
None
See application file for complete search history.

(56) References Cited

U.S. PATENT DOCUMENTS 9,524,439 B2 * 12/2016 Frenzel .................... G02B 5/20

FOREIGN PATENT DOCUMENTS

JP     2007329762 A     12/2007
JP     2010224670 A     10/2010
(Continued)

OTHER PUBLICATIONS

Road Sign Detection and Recognition Using Color Segmentation, Shape Analysis and Template Matching. Malik et al. (Year: 2007).*
(Continued)

*Primary Examiner* — Delomia L Gilliard
(74) *Attorney, Agent, or Firm* — Norton Rose Fulbright US LLP; Elizabeth Tretter

(57) ABSTRACT

A method and device for analyzing an image and providing the analysis for a driving assistance system of a vehicle, including recording the image; determining an operating state of the vehicle; analyzing the image using at least one image analysis method that is selected from at least two possible image analysis methods as a function of the operating state of the vehicle; and providing the analysis of the image as data values for the driving assistance system.

12 Claims, 2 Drawing Sheets

(52) U.S. Cl.
CPC ....... *G06K 9/6267* (2013.01); *B60W 2420/42* (2013.01); *B60W 2554/00* (2020.02); *B60W 2555/20* (2020.02)

(56) References Cited

FOREIGN PATENT DOCUMENTS

| WO | 2005115820 A1 | 12/2005 | |
|---|---|---|---|
| WO | WO2005115820 A1 * | 12/2005 | |
| WO | 2011154978 A2 | 12/2011 | |
| WO | WO-2011154978 A2 * | 12/2011 | ......... G06K 9/00536 |

OTHER PUBLICATIONS

Exploiting Street-Level Panoramic Images for Large-Scale Automated Surveys of Traffic Signs. Hazelhoff et al. (Year: 2014).*
Exploiting Street-Level Panoramic Images for Large-Scale Automated Surveying of Traffic Signs. Hazelhoff et al (Year: 2014).*
Road Sign Detection and Recognition Using Colour Segmentation, Shape Analysis and Template Matching, Malik et al (Year: 2007).*
International Search Report for PCT/EP2017/080033, dated Mar. 28, 2018.
Rabia Malik et al., "Road Sign Detection and Recognition Using Colour Segmentation, Shape Analysis and Template Matching", Machine Learning and Cybernetics, International Conference on, IEEE, PI , 2007, pp. 3556-3560, XP031154428.
Hazelhoff Lykele et al., "Exploiting street-level panoramic images for large-scale automated surveying of traffic sign", Machine Vision and Applications, Springer Verlag, DE, vol. 25, No. 7, 2014, pp. 1893-1911, XP035393381.

* cited by examiner

METHOD AND DEVICE FOR ANALYZING AN IMAGE AND PROVIDING THE ANALYSIS FOR A DRIVING ASSISTANCE SYSTEM OF A VEHICLE

FIELD OF THE INVENTION

The present invention relates to a method, as well as to a first device for analyzing an image and providing the analysis for a driving assistance system of a vehicle, the analysis being performed as a function of an operating state of the vehicle. The present invention also relates to a system for analyzing an image and for providing the analysis for a driving assistance system.

SUMMARY OF THE INVENTION

The method according to the present invention for analyzing an image and providing the analysis for a driving assistance system of a vehicle includes a step (task) of recording the image; a step of determining an operating state of the vehicle; a step of analyzing the image using at least one image analysis method, which is selected from at least two possible image analysis methods as a function of the operating state of the vehicle; and a step of providing the analysis of the image as data values for the driving assistance system.

This has the advantage that the image is analyzed very quickly and efficiently due to the purposeful selection of at least one image analysis method, which is chosen from at least two possible image analysis methods as a function of the operating state of the vehicle, since not all image analysis methods are performed in any arbitrary order.

This is especially advantageous when the vehicle is a partially, highly or fully automated vehicle since, in this case, the driving assistance systems are particularly dependent on a rapidly and efficiently performed analysis of an image, to ensure a reliable operation of the vehicle; in the context of the method of the present invention, a vehicle being possibly understood to be an automated vehicle, as well as a manually operated vehicle, or also to be a radio link-controlled vehicle.

In the context of the method of the present invention, the operating state of the vehicle may include a state of motion of the vehicle, such as a speed and/or an acceleration and/or a yaw angle and/or a pitch angle and/or a roll angle, for example. The operating state may also include an ambient condition of the vehicle, such as time-of-day and/or weather-related light conditions and/or a current location—in particular, country-specific—and/or traffic infrastructure features (condition and/or type of traffic route (turnpike, highway, country road, etc.) and/or width thereof).

In the context of the method of the present invention, the driving assistance system of the vehicle may be an assistance system for lateral and/or steering control; and/or an assistance system for navigation and/or, in particular, high-precision localization of the vehicle and/or an assistance system for providing information—for example, for an operator of the vehicle—and/or an assistance system for—in particular, safety-critical—monitoring of the vehicle and/or of the occupants of the vehicle. Likewise possible are other assistance systems which are not listed.

The image may represent an environment of the vehicle, and the data values include a description of at least one object therein. It is herein that particularly safety-related advantages are apparent since it is precisely objects in the environment of the vehicle, for example, such as other traffic participants, (vehicles, pedestrians, etc.) and/or animals and/or traffic signs and/or objects, that, in particular, are not permanent (lost items, construction sites, etc.) that have a considerable influence on a reliable operation of the vehicle that is improved by the description of these objects.

The image may be recorded as at least a partial image, the at least one partial image including a subset of properties of the image. Here, the advantage is derived that analyzing the at least one partial image is faster than analyzing the whole image since, in most cases, the information contained in the at least one partial image suffices to describe the at least one object in the environment of the vehicle.

Image properties are, for example, color shades (red, green, blue, etc.) and/or grayscale values and/or structure values—in particular, gradient values—of features contained in the image. A subset of image properties means that the subset has at least one fewer image property than the number of all image properties of the image.

The image may be recorded as at least two partial images, each of the at least two partial images including a different subset of image properties. Here, the advantage is derived that analyzing the at least two partial images is faster than analyzing the whole image, the at least two partial images being able to complement one another in a way that enables the at least one object to be described more rapidly and/or accurately. Moreover, the analyses of the at least two partial images may mutually validate plausibility. An example is a subset of the at least two partial quantities including grayscale values, and a second of the at least two partial quantities, a color value.

The operating state of the vehicle may include at least one of the following states: speed of the vehicle, weather conditions in the environment of the vehicle, light conditions in the environment of the vehicle.

The analysis may be performed by the at least one image analysis method in such a way that it includes at least one first analysis step and a second analysis step; at least one feature being classified by the first analysis step using the subset of image properties in the at least one partial image; and the at least one object being determined by the second analysis step using the at least one classified feature as a basis.

The at least one object may be a traffic sign and/or a pedestrian and/or another vehicle and/or an animal.

The device according to the present invention for analyzing an image and for providing the analysis for a driving assistance system of a vehicle includes a first arrangement for recording the image, a second arrangement for determining an operating state of the vehicle, third arrangement for analyzing the image using at least one image analysis method that is selected from at least two possible image analysis methods in dependence upon the operating state of the vehicle, and a fourth arrangement for providing the analysis of the image as data values for the driving assistance system.

The first arrangement and/or the second arrangement and/or the third arrangement and/or the fourth arrangement may be configured for a method in accordance with at least one of the method claims.

The system according to the present invention for operating a vehicle includes a camera system for capturing at least one image, a device in accordance with one of the device claims, and a driving assistance system for executing a driving assistance function.

In the context of the method of the present invention, the driving assistance system is, in particular, a control unit which is configured for performing a driving assistance function in accordance with at least one of the examples mentioned here.

Advantageous embodiments of the present invention are set forth in the dependent claims and delineated in the Specification.

Exemplary embodiments of the present invention are illustrated in the drawings and explained in greater detail in the following description.

DETAILED DESCRIPTION

Figure 1:
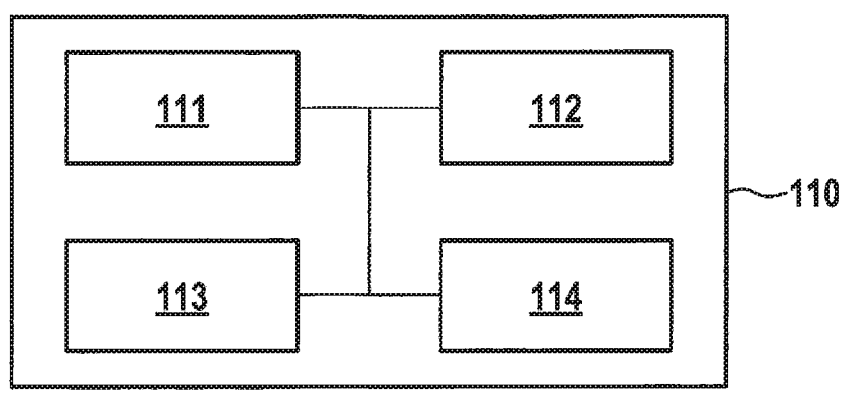
FIG. 1 shows purely exemplarily the device according to the present invention.

FIG. 1 shows a device 110 for analyzing 330 an image and for providing 340 the analysis for a driving assistance system 140 of a vehicle 100 that includes first arrangement 111 for recording 310 the image and second arrangement 112 for determining 320 an operating state of vehicle 100. It also includes third arrangement 113 for analyzing 330 the image using at least one image analysis method selected from at least two possible image analysis methods as a function of the operating state of vehicle 100, and fourth arrangement 114 for providing 340 the analysis of the image as data values for the driving assistance system 140.

First arrangement 111 for recording 310 an image are thereby configured to receive an image in the form of data values, for example, from a camera system 130 and process the same in correspondence therewith. For that purpose, first arrangement 111 includes a processor, a main memory, and memory device having corresponding programs, for example.

In a specific embodiment, first arrangement 111 is configured to record the image as at least a partial image, the at least one partial image including a subset of image properties of the image. This is accomplished, for example, by a plurality of input channels recording the image; each input channel being configured for recording a specific image property of the image, and for only routing the image properties of an input channel to third arrangement 113.

Additionally and optionally, first arrangement 111 is configured for recording the image and/or the at least one partial image in a way that segments the image and/or the at least one partial image into image regions upon recording 310. This is achieved, for example, by rasterizing the image, a single raster having a predefined size, and this size being a function of the operating state of the vehicle, for example. A raster has a size of 2×2 pixels, or of 4×4 pixels, for example. Fundamentally conceivable are many different sizes and shapes (squares, rectangles, etc.) that make an appropriate rasterization possible.

A first input channel is configured for recording grayscale values using 8 to 16 bits, for example; and/or a second input channel is configured for recording the colors red and/or green and/or blue using 8 or 12 or 16 bits; and/or a third input channel is configured for recording gradient values. Thus, each input channel corresponds to a filter that is configured for filtering out a predefined image property. During recording 310, the image properties are thereby assigned to an image region of the image and/or of the at least one partial image, for example.

Gradient values are recorded, for example, by the image including an object—for example, a round shape—having a specific color gradient and/or grayscale value curve, and the slope of this curve—relative to a predefined coordinate system—being recorded in a specific image region of the image by assigning the slope as a value to precisely this image region.

In another specific embodiment, first arrangement 111 is configured to enable the image to be recorded as at least two partial images, each of the at least two partial images including a different subset of image properties. This is accomplished, for example, by at least two input channels recording the image; each of the at least two input channels being configured to record a different image than that recorded by every other input channel.

The input channels record the image properties, for example, by recording them as data values in a way that enables these data values to be routed to third arrangement 113 and analyzed by third arrangement 113, the image properties being assigned to a specific image region of the image.

Second arrangement 112 is configured for determining an operating state of vehicle 100. This is accomplished, for example, by second arrangement 112 being connected to a first sensor system 150, which includes at least one sensor, the first sensor system being configured to determine at least one state of motion of vehicle 100. In addition, second arrangement 112 is connected to a second sensor system 160, for example, the second sensor system being configured to record an ambient condition of vehicle 100. For that purpose, second sensor system 160 includes a camera and/or a radar sensor and/or an ultrasonic sensor and/or a lidar sensor, for example.

In another specific embodiment, second sensor system 160 includes a transmitting and/or receiving unit, for example, which is configured for requesting and/or receiving weather data and/or light conditions (dark, light, etc.) in the environment of vehicle 100 by radio link. For purposes of transmitting and/or receiving, transmitting and/or receiving unit may also be configured to access an already existing unit, for example, a navigation system, and/or a Bluetooth device using a smart phone located in vehicle 100.

In another specific embodiment, second sensor system 160 includes a navigation system or is configured to access an already existing navigation system in vehicle 100. In this context, an ambient condition of vehicle 100 is recorded, for example, as, pending, darkness, by the navigation system recognizing a tunnel that is located immediately ahead of vehicle 100 in the direction of travel.

Using a processor, main memory, and a memory device, for example, which include corresponding determination software, second arrangement 112 and/or first sensor system 150 and/or second sensor system 160 are configured to record the operating state of vehicle 100, such as a state of motion and/or an ambient condition, for example, in the form of data values, and to route these data values to third arrangement 113.

Third arrangement 113 is configured for analyzing the image and/or the at least one partial image using at least one image analysis method that is selected from at least two possible image analysis methods as a function of the operating state of vehicle 100. The selection is thereby made, for example, in a way that enables predefined profiles to be assigned to a specific operating state. These predefined profiles, in turn, include image analysis methods suitable for this operating state. For example, an image analysis method is suited for rapidly and correctly analyzing the image and/or the at least one partial image at a speed of the vehicle up to a predefined maximum speed. Above the predefined maximum speed, another image analysis method is suited, since, on the whole, it analyzes fewer, but all relevant details, for example, even at higher speeds. Another image analysis method is suited, for example, for analyzing the image and/or the at least one partial image by analyzing colors. If second arrangement 112 determines that an ambient condition of the vehicle is dark, a different image analysis method, which analyzes gray tones, for example, is used at this stage, since, in accordance with specified criteria, the image and/or the at least one partial image contain(s) too few color values because of the dark environment.

In a specific embodiment, analysis 330 is performed by the at least one image analysis method in a way that enables the at least one image analysis method to include a first analysis step and a second analysis step; at least one feature being classified by the first analysis step using the subset of image properties in the at least one partial image, and the at least one object being determined by the second analysis step using the at least one classified feature as a basis.

The first analysis step includes the following first sub-steps, for example (all sub-steps—of the first and/or second analysis step—are thereby performed in a way that makes it possible to use suitable software to accomplish an appropriate processing of data values, which represent the image and/or the at least one partial image and or versions thereof already processed by first arrangement 111, without their being explicitly mentioned in every step):

Cells are generated from the input channels. Here, the individual values (color values, grayscale values, gradient values, etc.) of the input channels, which are present within an image region, are aggregated and—in case a plurality of values are included within an image region—a mean value is calculated therefrom, and the result is assigned to a cell. A cell thereby contains at least one image region, it also being possible to link a plurality of image regions to one cell.

The results of the aggregation are stored as internal intermediate images by saving all cells, and, on the basis of the internal intermediate images, the first set of functions is used to analyze the stored cells, and one or a plurality of features is/are classified. For example, if the at least one object in the environment of vehicle 100 is a traffic sign, the following features are classified: closed and round shape, exterior red and interior white; black symbols are located within the white region.

The classification is carried out using at least one of the following methods, for example:

ACF (aggregate channel features): simple access to one of the cells and matching with stored features (for example, on the memory device of third arrangement 113); a cell analyzed in accordance with this method is referred to as an ACF cell;

FCF (filter channel features): linear combination of various ACF cells from the same input channel or from different input channels;

CBF (checkerboard features): weighted linear combination from various ACF cells from the same input channel or from different input channels; and SeSi (self similarity features): doubling the accesses of all previously named methods (ACF, FCF, CBF) at two different positions and (weighted) linear combination of the results.

The second analysis step includes the following sub-steps, for example:

The features classified in the aforementioned, first analysis step are linked together.

The linking of the classified features is successively analyzed relative to image regions and/or cells; following each analysis stage, it being decided in accordance with specified criteria whether the successive analysis will be interrupted or continued with another stage. In accordance with specified criteria, each of the stages thereby analyzes each cell and/or each image region in greater detail than the previous stage. When all of the stages have gone through analysis, a possible object is located at the current position in the image and/or in at least a partial image—thus in the current cell and/or in the current image region.

The preceding sub-step is repeated until it is known for all cells and/or image regions whether or not a possible object exists.

The possible objects are determined by matching them to already stored texture information. For example, on the basis of the features named exemplarily in the first analysis step, a road sign, which represents speed limit data, is recognized in accordance with the German highway code.

Following execution of the first and/or second analysis step, data values, which represent the analysis of the image, are routed to fourth arrangement 114. At this stage, the routed data values thereby represent the information that a speed limit, having a specified maximum speed, applies in the environment of vehicle 100.

To this end, fourth arrangement 114 is configured for providing the analysis of the image as data values for driving assistance system 140. In this regard, the fourth arrangement includes a processor, main memory, and a memory device, for example, and are configured for rewriting and/or modifying data values received from third arrangement 113 to permit processing thereof by driving assistance system 140; to that end, the data format, for example, being adapted as a function of corresponding driving assistance system 140.

Figure 2:
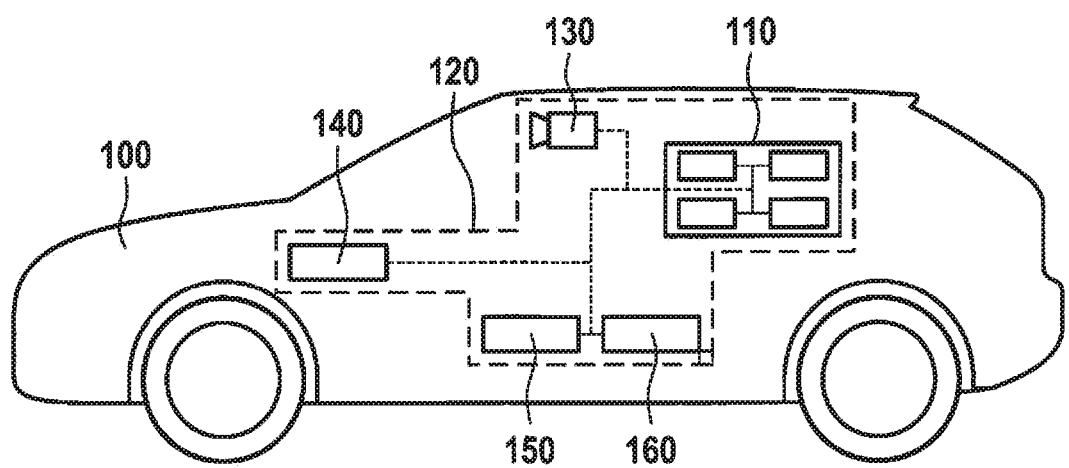
FIG. 2 shows purely exemplarily a vehicle that includes the device according to the present invention, as well as the system according to the present invention.

FIG. 2 shows a vehicle 100 that includes a system 120 for operating vehicle 100. It includes a camera system 130 for capturing at least one image, a device 110 for analyzing 330 the at least one image and for providing 340 the analysis for a driving assistance system 140 of vehicle 100, and driving assistance system 140 for executing a driving assistance function for operating vehicle 100. Camera system 130 includes a monocamera and/or a stereo camera and/or both, for example, and is configured for capturing images of an environment of vehicle 100. Camera system 130 may be thereby mounted in a way that enables it to capture the environment in any viewing direction from vehicle 100.

In a specific embodiment, camera system 130 includes a plurality of cameras (monocameras and/or stereo cameras) in a way that enables the environment to be captured in more than one direction emanating from the vehicle (to the front, rear, left, right).

Furthermore, camera system 130 is configured to route a captured image in the form of data values to device 110 for analyzing 330 the image and for providing 340 the analysis for a driving assistance system 140.

Device 110 for analyzing 330 the image and providing 340 the analysis for a driving assistance system 140 of vehicle 100 is configured for recording the image in the form of data values, for performing an analysis of the image as a function of an operating state of vehicle 100, and for routing the analysis, which represents information on at least one object in the environment of the object, to driving assistance system 140.

The operating state of vehicle 100 is determined 320 by a first sensor system 150, for example, which includes at least one sensor, the first sensor system being configured to determine at least one state of motion of vehicle 100. Furthermore, the operating state is determined 320 by a second sensor system, for example, which is configured for recording an ambient condition of vehicle 100. For that purpose, second sensor system 160 includes a camera and/or a radar sensor and/or an ultrasonic sensor and/or a lidar sensor, for example.

Another specific embodiment provides that second sensor system 160 be configured not to include any integral sensors, rather to access sensors already included in vehicle 100 that do not belong to system 120. In this case, this may likewise be a camera and/or a radar sensor and/or an ultrasonic sensor and/or a lidar sensor, for example.

In another specific embodiment, second sensor system 160 additionally or optionally includes a transmitting and/or receiving unit, which is configured for requesting and/or receiving weather data and/or light conditions (dark, light, etc.) in the environment of vehicle 100 by radio link.

Furthermore, system 120 includes a driving assistance system 120, which is configured for receiving data values, which represent information on at least one object in the environment of the object. In addition, driving assistance system 140 is configured for operating vehicle 100 as a function of these data values. In another specific embodiment, driving assistance system 140 is configured not to operate vehicle 100 directly, rather to drive control units already present in vehicle 100.

Figure 3:
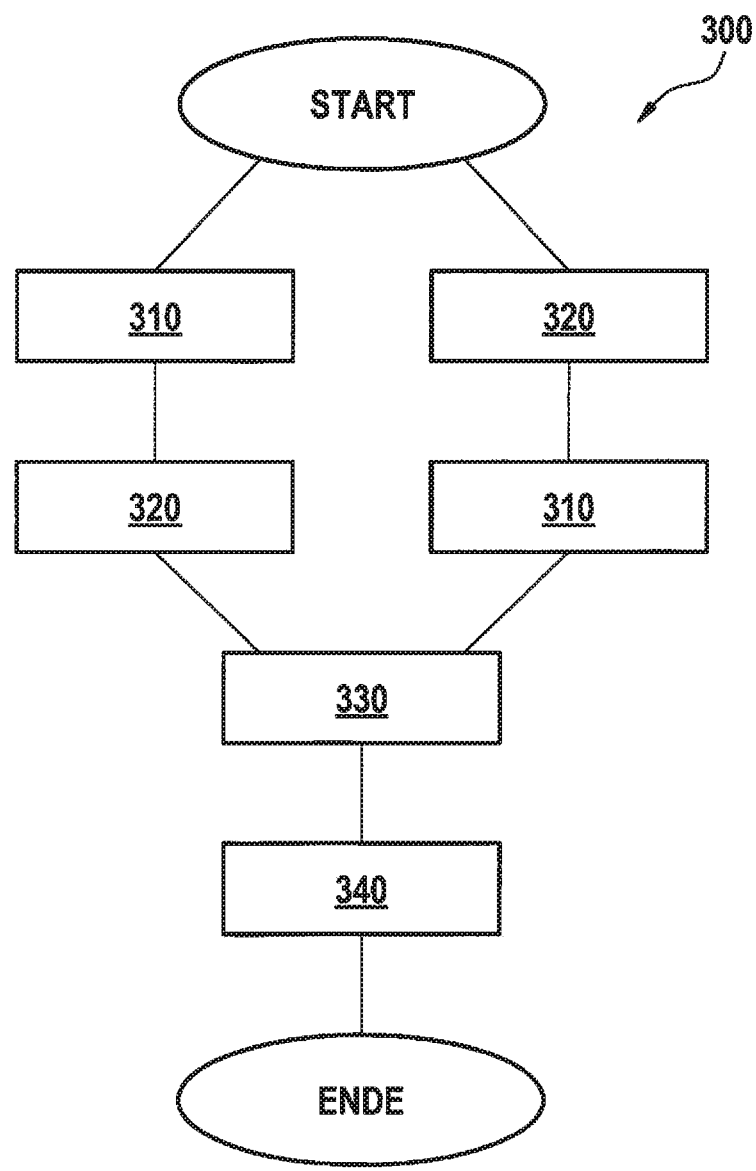
FIG. 3 shows purely exemplarily an exemplary embodiment in the form of a flow chart.

In the form of a flow chart, FIG. 3 shows an exemplary embodiment of method 300 according to the present invention for analyzing an image and providing the analysis for a driving assistance system 140 of a vehicle 100.

In step 310, an image that was captured by a camera system 130, for example, is recorded.

An operating state of vehicle 100 is determined in step 320.

Steps 310 and 320 may also be performed in reverse order, the order being dependent, for example, on the configuration of device 110 and/or on a default setting selected by a manufacturer or an operator of vehicle 100. If step 320 is performed first, first arrangement 111 for recording the image may be configured in such a way that recording 310 the image is already a function of the operating state of vehicle 100.

The image is analyzed in step 330.

In step 340, the analysis of the image is provided as data values for driving assistance system 140.

What is claimed is:

1. A method of an image analysis system of a vehicle for analyzing an image and providing the analysis for a driving assistance system of the vehicle, a plurality of operating states of the vehicle being predefined in the image analysis system and a plurality of image analysis processes being predefined in the image analysis system, the method comprising:
   recording the image;
   identifying which one of the predefined plurality of operating states is a current operating state of the vehicle;
   based on the one of the predefined plurality of operating states having been identified as being the current operating state of the vehicle, selecting, from the plurality of image analysis processes, at least one of the plurality of image analysis processes that is predefined in the image analysis system as corresponding to the one of the predefined plurality of operating states that has been identified as being the current operating state of the vehicle;
   based on the selection, analyzing the image selectively using the at least one image analysis process that has been selected, without use of others of the plurality of image analysis processes; and
   providing the analysis of the image as data values for the driving assistance system.

2. The method of claim 1, wherein the image represents an environment of the vehicle, and wherein the data values are a description of at least one object therein.

3. The method of claim 1, wherein the image is recorded as at least a partial image, and wherein the at least one partial image includes a subset of image properties of the image.

4. The method of claim 3, wherein the image is recorded as at least two partial images, and wherein each of the at least two partial images includes a different subset of image properties.

5. The method of claim 1, wherein the operating state of the vehicle includes at least one of the following states: a speed of the vehicle, weather conditions in an environment of the vehicle, and light conditions in the environment of the vehicle.

6. The method of claim 3, wherein the analysis is performed by the at least one image analysis process in a way that enables the at least one image analysis process to include a first analysis task and a second analysis task, wherein at least one feature is classified by the first analysis task using the subset of image properties in the at least one partial image, and wherein the at least one object is determined by the second analysis task based on the at least one classified feature.

7. The method of claim 2, wherein the at least one object is a traffic sign, a pedestrian, another vehicle and/or an animal.

8. A device for analyzing an image and providing the analysis for a driving assistance system of a vehicle, the device comprising: a camera system that includes a camera, wherein the camera system is configured to record the image with the camera; a storage in which a plurality of operating states of the vehicle are predefined and a plurality of image analysis processes are predefined; and
   at least one processor, wherein the at least one processor is configured to:
      identify which one of the predefined plurality of operating states is a current operating state of the vehicle;
      based on the one of the predefined plurality of operating states having been identified as being the current operating state of the vehicle, select, from the plurality of image analysis processes, at least one of the plurality of image analysis processes that is predefined in the storage as corresponding to the one of the predefined plurality of operating states that has been identified as being the current operating state of the vehicle;
      based on the selection, analyze the image selectively using the at least one image analysis process that has been selected, without use of other of the plurality of image analysis processes; and
      provide the analysis of the image as data values for the driving assistance system.

9. The device of claim 8, wherein the analysis is performed by the at least one image analysis process in a way that enables the at least one image analysis process to include a first analysis task and a second analysis task, wherein at least one feature is classified by the first analysis task using a subset of image properties in at least one partial image of the image, and wherein at least one object represented in the image is determined by the second analysis task based on the at least one classified feature.

10. A system for operating a vehicle, the system comprising: a camera system for capturing an image; a driving assistance system for executing a driving assistance function; and a device for analyzing the image and providing the analysis for the driving assistance system of the vehicle, the device including:
- a camera system that includes a camera, wherein the camera system is configured to record the image with the camera; a storage in which a plurality of operating states of the vehicle are predefined and a plurality of image analysis processes are predefined; and
- at least one processor;

wherein the at least one processor is configured to:
- identify which one of the predefined plurality of operating states is a current operating state of the vehicle;
- based on the one of the predefined plurality of operating states having been identified as being the current operating state of the vehicle, select, from the plurality of image analysis processes, at least one of the plurality of image analysis processes that is predefined in the storage as corresponding to the one of the predefined plurality of operating states that has been identified as being the current operating state of the vehicle;
- based on the selection, analyze the image selectively using the at least one image analysis process that has been selected, without use of other of the plurality of image analysis processes; and
- provide the analysis of the image as data values for the driving assistance system.

11. The method of claim 1, wherein a first of the predefined plurality of operating states is a first speed range at which the vehicle is traveling and a second of the predefined plurality of operating states is a second speed range at which the vehicle is traveling, so that different ones of the predefined plurality of image analysis processes are used for the analysis depending on an identified current speed of the vehicle.

12. The method of claim 11, wherein the different ones of the predefined plurality of image analysis processes that are used for the analysis depending on the identified current speed of the vehicle, differ with respect to a number of image details of the image are analyzed.

\* \* \* \* \*